United States Patent
Al-Kabra et al.

(10) Patent No.: US 11,310,325 B2
(45) Date of Patent: Apr. 19, 2022

(54) APPLICATION SESSION EVENT INFERENCE FROM NETWORK ACTIVITY

(71) Applicant: T-Mobile USA, Inc., Bellevue, WA (US)

(72) Inventors: Rami Al-Kabra, Bothell, WA (US); Ruchir Sinha, Newcastle, WA (US); Jonathan Patrick Morrow, Issaquah, WA (US); Prem Kumar Bodiga, Bellevue, WA (US); Ijaz Ahamed Meeran Abdul Jabbar, Bellevue, WA (US)

(73) Assignee: T-Mobile USA, Inc., Seattle, WA (US)

( * ) Notice: Subject to any disclaimer, the term of this patent is extended or adjusted under 35 U.S.C. 154(b) by 236 days.

(21) Appl. No.: 15/853,513

(22) Filed: Dec. 22, 2017

(65) Prior Publication Data

US 2019/0199811 A1    Jun. 27, 2019

(51) Int. Cl.
| | |
|---|---|
| *H04L 29/08* | (2006.01) |
| *H04L 12/26* | (2006.01) |
| *G06N 20/00* | (2019.01) |
| *G06Q 30/02* | (2012.01) |
| *G06F 16/335* | (2019.01) |
| *G06F 16/9535* | (2019.01) |
| *H04L 67/50* | (2022.01) |
| *H04L 43/062* | (2022.01) |

(52) U.S. Cl.
CPC ............ *H04L 67/22* (2013.01); *G06F 16/337* (2019.01); *G06F 16/9535* (2019.01); *G06N 20/00* (2019.01); *G06Q 30/0201* (2013.01); *H04L 43/062* (2013.01)

(58) Field of Classification Search
CPC ... H04L 67/22; H04L 43/062; H04L 63/1416; H04L 63/1408; H04L 43/04; G06F 16/337; G06N 20/00; G06Q 30/0201
See application file for complete search history.

(56) References Cited

U.S. PATENT DOCUMENTS

| | | | |
|---|---|---|---|
| 8,954,346 B1 * | 2/2015 | Walker ................. | H04N 21/435 386/249 |
| 9,426,049 B1 * | 8/2016 | Kalavade ............ | H04L 43/0876 |
| 9,973,398 B1 * | 5/2018 | Sieracki .................. | H04L 43/04 |
| 2008/0091453 A1 * | 4/2008 | Meehan ............... | G06Q 20/341 705/317 |

(Continued)

*Primary Examiner* — Lesa M Kennedy
(74) *Attorney, Agent, or Firm* — Lee & Hayes, P.C.

(57) ABSTRACT

A computing system may automatically infer one or more events that occur during an application session involving activity on a network, such as the Internet. Such an application session may be interactions with, for example, social networking websites, banking websites, news websites, and so on. Events are any of a number of activities or transactions that may occur during the application session. The computing system may automatically infer an event by gathering network transaction data for network transactions performed by one or more client devices of a wireless communication network. The computing system may generate a network activity signature based, at least in part, on the network transaction data and apply pattern recognition and/or machine learning to the network activity signature to infer events associated with the network activity signature.

14 Claims, 6 Drawing Sheets

(56) References Cited

U.S. PATENT DOCUMENTS

| | | | |
|---|---|---|---|
| 2008/0098220 A1* | 4/2008 | Spalink | G06F 21/6254 |
| | | | 713/168 |
| 2009/0164270 A1* | 6/2009 | Seidman | G06Q 10/06 |
| | | | 705/7.38 |
| 2013/0326055 A1* | 12/2013 | Chatterjee | H04L 43/04 |
| | | | 709/224 |
| 2016/0072834 A1* | 3/2016 | Bott | H04L 63/145 |
| | | | 726/1 |
| 2016/0364743 A1* | 12/2016 | St. Lawrence | G06Q 30/0233 |
| 2019/0166102 A1* | 5/2019 | Chizi | G06F 21/6245 |

* cited by examiner

APPLICATION SESSION EVENT INFERENCE FROM NETWORK ACTIVITY

BACKGROUND

In recent years, telecommunication devices have advanced from offering simple voice calling services within wireless communication networks to providing users with many new features. Telecommunication devices now provide messaging services such as email, text messaging, and instant messaging. Such devices may also provide data services such as Internet browsing, media services such as storing and playing a library of favorite songs, and location services, just to name a few examples. Thus, telecommunication devices, referred to herein as user devices or mobile devices, are often used in multiple contexts. In addition to such features provided by telecommunication devices, the number of users of these devices have greatly increased. Such an increase in users is expected to continue.

In wireless communication networks, mobile devices generally include numerous applications ("apps") and/or subscriptions to various sites, such as websites on the Internet. For example, a user of a mobile device may access several apps that are directed to various news sites such as, for example, CNN®, MSNBC®, local television stations, etc. Additionally, the user may include apps on a mobile device that are directed to various types of websites such as, for example, sporting sites, entertainment sites, search sites (e.g., Yahoo®), music sites, etc. Access to such sites may involve any of a number of types of activities, such as uploading or downloading data (e.g., photos, video, music, computer code, etc.) selecting Internet links to other sites, making product purchases, and browsing, just to name a few examples.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
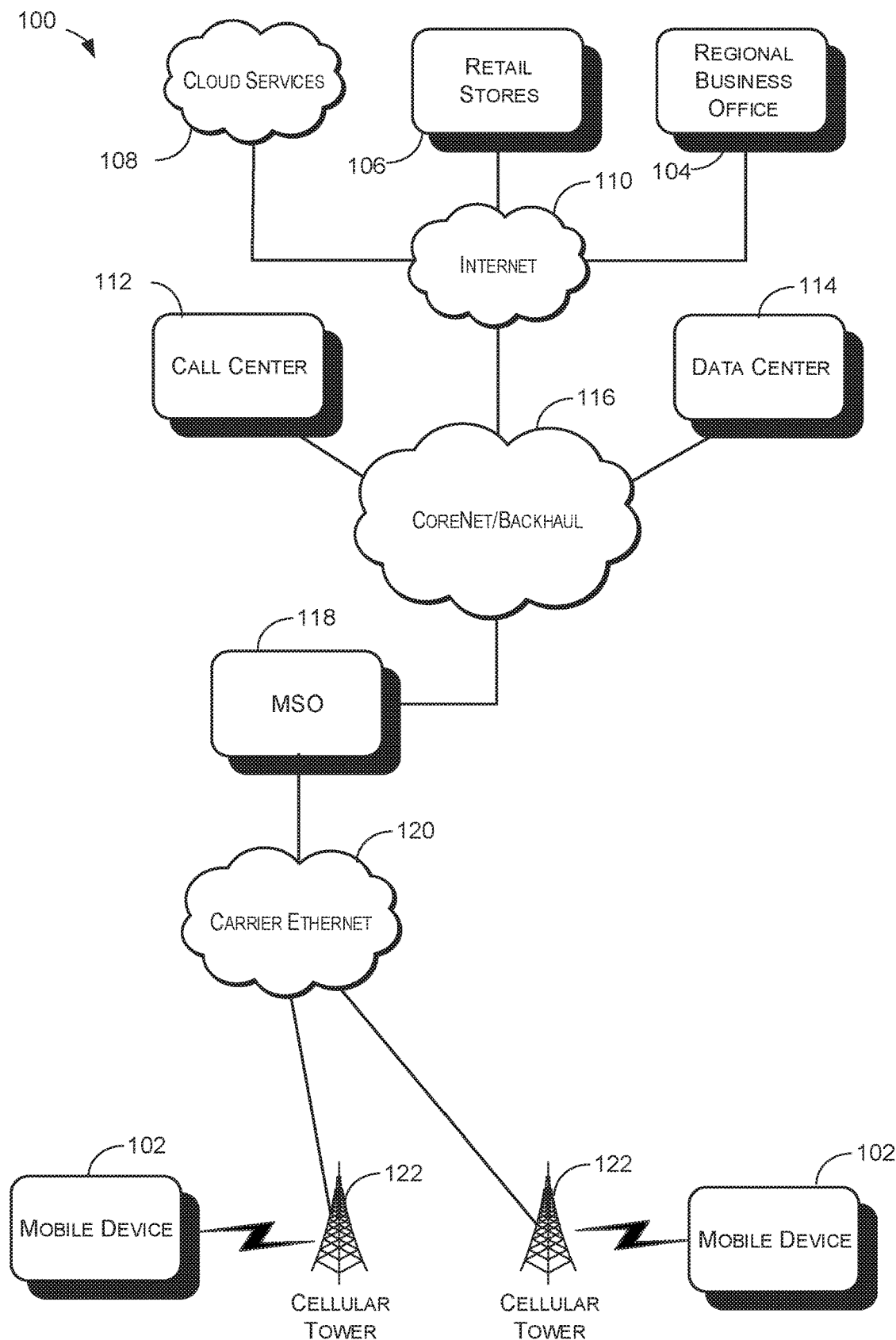
FIG. 1 schematically illustrates a wireless communication network, according to various embodiments.

Described herein are techniques and architecture that allow a computing system to automatically infer one or more events that occur during an application session involving activity on a network, such as the Internet. Such an application session may be interactions with, for example, Google®, Facebook®, Pandora®, Wikipedia®, banking websites, various news websites, and so on. Events refer to any of a number of activities or transactions that may occur during the application session. For example, as herein used, an event is selecting (e.g., by a user of a client device) a link associated with an advertisement posted on a webpage of a website (e.g., Google®, Facebook®, and so on). Another example of an event is an upload or download of data between a client device and an entity on the network. Still other examples of events include a user of a client device entering a website, browsing the website, and exiting the website.

An ability of a computing system to automatically infer an event that occurs during an application session may provide a number of benefits. For example, increasingly, inference may necessarily replace direct detection or measurement of events because security and encryption of network activity between a client device and a website has been, and is expected to be, continually increasing. In other words, it is becoming increasingly difficult to detect activities of a user as the use of network and website encryption increases. Thus, event inference may be a relatively important tool for gaining general knowledge of web traffic flow, marketing analysis, and so on.

In various embodiments, a computing system may automatically infer an event that occurs during an application session by gathering network transaction data for network transactions performed by one or more client devices of a wireless communication network. For example, such network transactions include, but are not limited to, a user of a client device selecting a link associated with an advertisement posted on a webpage of a website, an upload or a download of data between a client device and an entity (e.g., Cloud, website, etc.) on the network, the entering a website, browsing the website, and exiting the website, just to name a few examples. Data associated with such network transactions may include any measurable or detectable quantity such as, for example, timestamp, duration, quantity and direction of data transferred, type of data transferred, rate of data transfer, frequency of occurrence of such network transactions by a particular user, metrics associated with user behavior, historical network transaction data, and so on. In some examples, data associated with such network transactions may be stored in a weblog associated with a particular client device.

The computing system may generate network activity signatures based, at least in part, on the network transaction data. As explained in detail below, a network activity signature is a representation of the network transaction data, or at least a portion thereof. In a particular example, a network activity signature may be an alphanumeric string that represents the network transaction data in an encoded fashion. In this situation, one part of the alphanumeric string may represent time durations or time stamps, another part of the alphanumeric string may represent a particular website, another part of the alphanumeric string may represent a habits or personal preferences of a particular user, and so on, for example.

The computer system may apply pattern recognition and/or machine learning to a network activity signature to infer events associated with the network activity signature. Success rate and reliability of inference may increase by a priori having a relatively large number of network activity signatures used as training for the machine learning, for example. Thus, in some embodiments, the computer system may, over a relatively long period of time, collect a relatively large amount of network transaction data of many users to generate a database of network activity signatures. Individual network activity signatures generated afterward may subsequently be compared (e.g., by pattern recognition, sequence analysis, and/or machine learning) to such a database to allow the computer system to infer one or more events represented, at least in part, by an individual network activity signature.

FIG. 1 schematically illustrates an example of a wireless communication network 100 (also referred to herein as network 100) that may be accessed by mobile devices 102 (which need not necessarily be mobile and are also referred to herein as client devices). As can be seen, in various configurations, the wireless communication network 100 includes multiple nodes and networks. The multiple nodes and networks may include one or more of, for example, a regional business office 104, one or more retail stores 106, cloud services 108, the Internet 110, a call center 112, a data center 114, a core net/backhaul network 116, a mobile switch office (MSO) 118, and a carrier Ethernet 120. Wireless communication network 100 may include other nodes and/or networks not specifically mentioned, or may include fewer nodes and/or networks than specifically mentioned. In some examples, network 100 may provide infrastructure for one or more events that occur during an application session.

Access points such as, for example, cellular towers 122, can be utilized to provide access to wireless communication network 100 for mobile devices 102. In various configurations, wireless communication network 100 may represent a regional or subnetwork of an overall larger wireless communication network. Thus, a larger wireless communication network may be made up of multiple networks similar to wireless communication network 100 and thus the nodes and networks illustrated in FIG. 1 may be replicated within the larger wireless communication network.

In configurations, mobile devices 102 may comprise any devices for communicating over a wireless communication network. Such devices include mobile telephones, cellular telephones, mobile computers, Personal Digital Assistants (PDAs), radio frequency devices, handheld computers, laptop computers, tablet computers, palmtops, pagers, as well as desktop computers, devices configured as Internet of Things (IoT) devices, integrated devices combining one or more of the preceding devices, and/or the like. As such, mobile devices 102 may range widely in terms of capabilities and features. For example, one of mobile devices 102 may have a numeric keypad, a capability to display only a few lines of text and be configured to interoperate with only GSM networks. However, another of mobile devices 102 (e.g., a smart phone) may have a touch-sensitive screen, a stylus, an embedded GPS receiver, and a relatively high-resolution display, and be configured to interoperate with multiple types of networks. The mobile devices may also include SIM-less devices (i.e., mobile devices that do not contain a functional subscriber identity module ("SIM")), roaming mobile devices (i.e., mobile devices operating outside of their home access networks), and/or mobile software applications.

In configurations, wireless communication network 100 may be configured as one of many types of networks and thus may communicate with mobile devices 102 using one or more standards, including but not limited to GSM, Time Division Multiple Access (TDMA), Universal Mobile Telecommunications System (UMTS), Evolution-Data Optimized (EVDO), Long Term Evolution (LTE), Generic Access Network (GAN), Unlicensed Mobile Access (UMA), Code Division Multiple Access (CDMA) protocols (including IS-95, IS-2000, and IS-856 protocols), Advanced LTE or LTE+, Orthogonal Frequency Division Multiple Access (OFDM), General Packet Radio Service (GPRS), Enhanced Data GSM Environment (EDGE), Advanced Mobile Phone System (AMPS), WiMAX protocols (including IEEE 802.16e-2005 and IEEE 802.16m protocols), High Speed Packet Access (HSPA), (including High Speed Downlink Packet Access (HSDPA) and High Speed Uplink Packet Access (HSUPA)), Ultra Mobile Broadband (UMB), and/or the like. In embodiments, as previously noted, the wireless communication network 100 may be include an IMS 100a and thus, may provide various services such as, for example, voice over long term evolution (VoLTE) service, video over long term evolution (ViLTE) service, rich communication services (RCS) and/or web real time communication (Web RTC).

Figure 2:
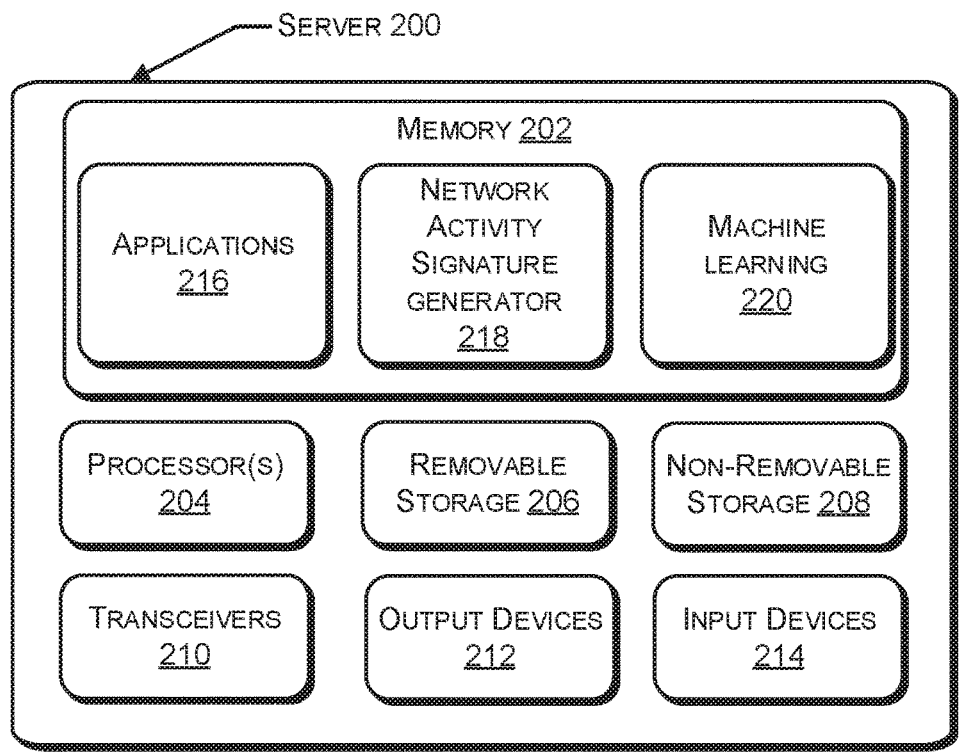
FIG. 2 illustrates a component level view of an example server configured for use in a wireless communication network.

FIG. 2 schematically illustrates a component level view of a server 200, e.g., a server configured for use as a node for use within a wireless communication network such as 100, according to processes described herein. Server 200 includes a system memory 202, processor(s) 204, a removable storage 206, a non-removable storage 208, transceivers 210, output device(s) 212, and input device(s) 214.

In various implementations, system memory 202 is volatile (e.g., RAM), non-volatile (e.g., ROM, flash memory, etc.) or some combination of the two. In some implementations, processor(s) 204 is a central processing unit (CPU), a graphics processing unit (GPU), or both CPU and GPU, or any other sort of processing unit. System memory 202 may also include applications 216 that allow the server to perform various functions. Among applications 216 or separately, memory 202 may also include a network activity signature (NAS) generator module 218 and a machine learning module 220.

In some embodiments, server 200 may be a computing system configured to automatically infer one or more events that occur during an application session involving activity on a network, such as 100 or Internet 110. Applications 216 may include code that, upon execution, allows server 200 to automatically infer an event that occurs during a network application session by gathering network transaction data for network transactions performed by one or more mobile devices (e.g., 102) of wireless communication network 100. NAS generator module 218 may generate network activity signatures based, at least in part, on network transaction data, such as that described above. For example, NAS generator module 218 may generate an alphanumeric string that represents network transaction data. Machine learning module 220 may apply pattern recognition and/or machine learning to a network activity signature to infer events associated with the network activity signature.

Server 200 may also include additional data storage devices (removable and/or non-removable) such as, for example, magnetic disks, optical disks, or tape. Such additional storage is represented in FIG. 2 by removable storage 206 and non-removable storage 208.

Non-transitory computer-readable media may include volatile and nonvolatile, removable and non-removable tangible, physical media implemented in technology for storage of information, such as computer readable instructions, data structures, program modules, or other data. System memory 202, removable storage 206 and non-removable storage 208 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by server 200. Any such non-transitory computer-readable media may be part of server 200.

In some implementations, transceivers 210 include any sort of transceivers known in the art. For example, transceivers 210 may include wired communication components, such as an Ethernet port, for communicating with other networked devices. Also or instead, transceivers 210 may include wireless modem(s) to may facilitate wireless connectivity with other computing devices. Further, transceivers 210 may include a radio transceiver that performs the function of transmitting and receiving radio frequency communications via an antenna.

In some implementations, output devices 212 include any sort of output devices known in the art, such as a display (e.g., a liquid crystal display), speakers, a vibrating mechanism, or a tactile feedback mechanism. Output devices 212 also include ports for one or more peripheral devices, such as headphones, peripheral speakers, or a peripheral display.

In various implementations, input devices 214 include any sort of input devices known in the art. For example, input devices 214 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Figure 3:
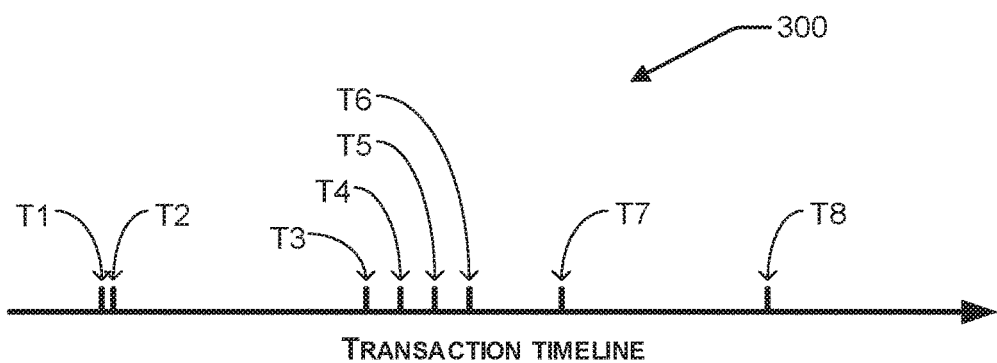
FIG. 3 schematically illustrates a timeline of example transactions in a wireless communication network.

FIG. 3 schematically illustrates a timeline 300 of example transactions occurring during an application session in a wireless communication network. For instance, such transactions may occur during the application session performed by a user of a client device (e.g., mobile device 102) interacting with a network-based service or application (e.g., social network website, Cloud computing service, etc.). Data associated with such transactions may be used by server 200, for example, to generate a network activity signature for the particular application session.

In the figure, T1-T8 refer to each of the example transactions. In some embodiments, data associated with such transactions may be recorded in a weblog associated with a particular client device and maintained and/or managed by server 200 (via applications 216, for example). The weblog may record any measurable or detectable quantity regarding the transaction such as, for example, timestamp, duration, quantity and direction of data transferred, type of data transferred, rate of data transfer, and metrics associated with user behavior of the client device, just to name a few examples. Such a weblog may provide a source for historical network transaction data, which may be useful for training data for machine learning, for example.

To provide a particular example, transaction T1 may be a user entering a website, which may be identified by its Internet protocol (IP) address. In some cases, the IP address may not be available or may not be visible to server 200. Whether or not the IP address is available or visible may affect the resulting network activity signature: generally, a network activity signature that includes an IP address may be more useful than a network activity signature sans such an IP address. In any case, a computer system (e.g., server 200) may generally attempt to gather, possibly in the form of a weblog, as much data as is available (e.g., visible and not encrypted) in order to generate the "most-useful" network activity signature under circumstances presented by the application session. Among a number of reasons, visibility of an IP may depend upon the operating system of the client device or the associated website.

Continuing, subsequent transaction T2 may be a transfer of a relatively small amount of data that may be handshaking or some type of acknowledgement of connectivity between the client and website. As in the case for the IP address, such data may not be visible to server 200, but the occurrence of the data transfer is visible. The time of occurrence (e.g., timestamp) of each transaction, such as T1 and T2, may be recorded in the weblog. Transaction T3 may be the user selecting (e.g., mouse-clicking) on an advertisement embedded in (e.g., hosted by) the website associated with the IP address. Transaction T4 may be a transfer of a relatively small amount of data that may be handshaking or some type of acknowledgement of connectivity between the client and a second website associated with the advertisement. Transaction T5 may be the user selecting a feature, such as a tab or button, in the second website, which results in a transfer to a new page of the second website. Transaction T6 may be the user again selecting a feature, such as a tab or button, in the second website, which modifies the new page of the second website. Transaction T7 may be the user selecting a feature, such as a tab or button, to download or play a song or video hosted by the website. Transaction T8 may be the user exiting the website.

To provide another particular example, transaction T1 may be a user entering a website, which may be identified by its Internet protocol (IP) address. Transaction T2 may be a transfer of a relatively small amount of data that may be handshaking or some type of acknowledgement of connectivity between the client and website. Transaction T3 may be the beginning of a bulk transfer of data from the client device to the website. Such a transfer of data may be for uploading a video to a video hosting website, for example. Such a bulk transfer of data may be broken into multiple parts, such that all the data is transferred portion-wise. For example, transaction T3 may be 10 megabytes (Mb) of a 38 Mb video. Transaction T4 may be the second 10 Mb portion of the 38 Mb video, transaction T5 may be the third 10 Mb portion of the 38 Mb video, and transaction T6 may be the final portion of the 38 Mb video. Transaction T7 may be the user selecting a feature, such as a tab or button, to transfer to a page that allows for adding text to accompany the video while it is hosted by the website. Transaction T8 may be the user exiting the website. Of course, any number of transactions may occur between and among the described transactions T1-T8, and claimed subject matter is not so limited.

Figure 4:
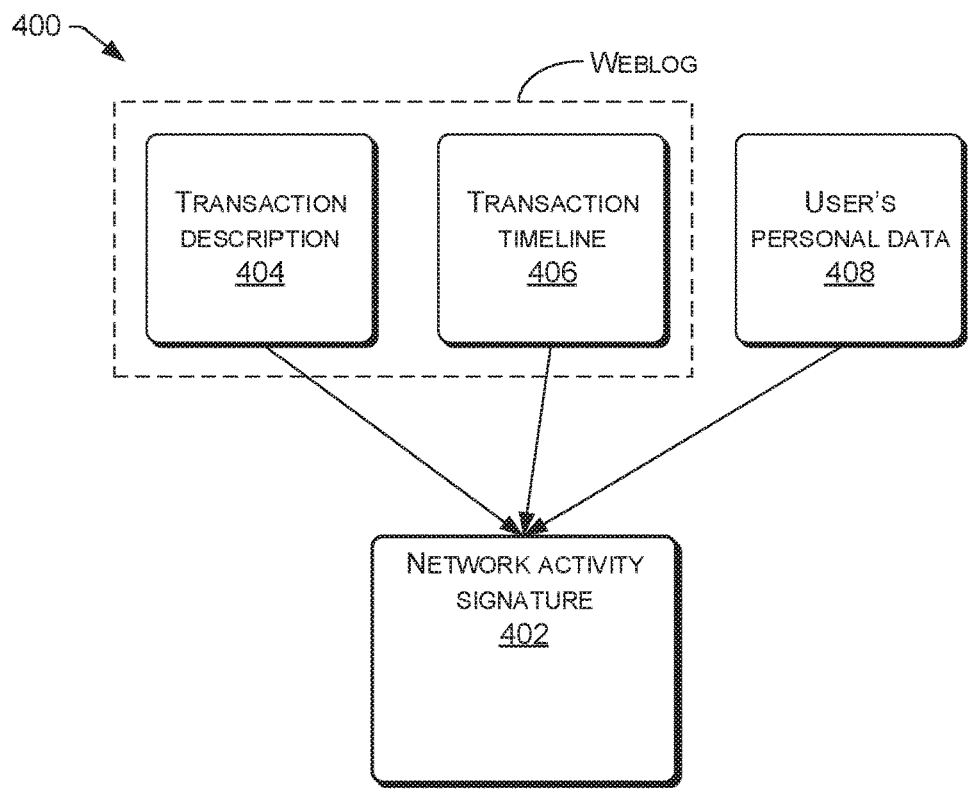
FIG. 4 schematically illustrates elements considered for generating a network activity signature, according to various embodiments.

FIG. 4 schematically illustrates a process 400 for considering elements to generate a network activity signature 402 for an application session of a user of a client device, according to various embodiments. Process 400 may be performed by server 200, for example. Such elements may be provided by a weblog for the application session, as described above for example, in addition to other sources such as personal data about the user and/or client device. Note that in various embodiments a user may opt-out of having personal data used in such a fashion.

A weblog or other source (e.g., memory 202 hosted by server 200) may comprise a transaction description block 404 and a transaction timeline block 406. The weblog (or other source) may provide information about individual transactions that occur during the application session to NAS generator 218. The user's personal data, such as user preferences, phone number associated with the client device, and so on, may be stored in memory 202 and retrieved for use in generating the network activity signature, for example. Transaction description block 404 may provide a description or category of type of transaction and transaction timeline block 406 may provide associated timing information, such as time of day and date that the transaction occurred, as well as duration of the transaction, and so on. User's personal data may be provided by block 408 and may include information regarding phone number, personal preferences, history and frequency of websites visited, browsing behavior or patterns, and so on. In some embodiments, such personal data is not considered for generating a network activity signature. In some embodiments, such personal data may be used only after the data is combined with relatively many other users so as to anonymize the data. Such anonymized data may be useful for generating a network activity signature for an individual user, even though the data reflects many other users. For example, such data may indicate popularity of websites, thus conveying the likelihood of a user visiting particular websites (e.g., if anonymized data indicates that many users visit the Facebook® website, then there is a relatively high likelihood that the user is visiting the same website).

Figure 5:
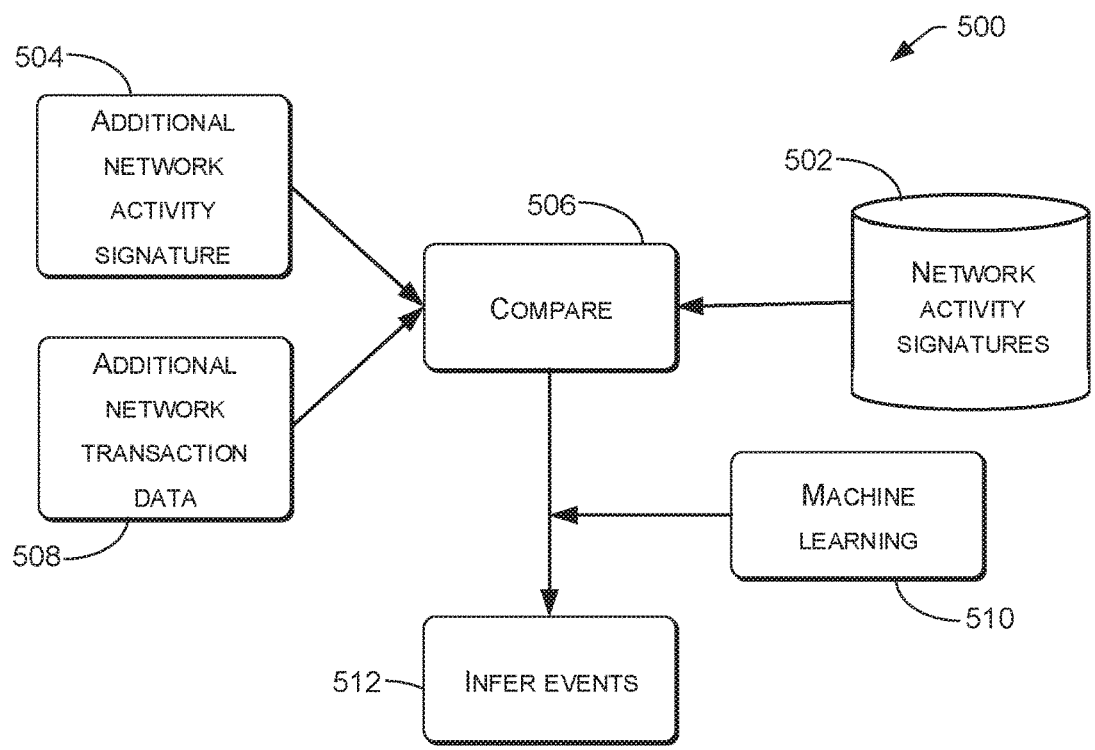
FIG. 5 schematically illustrates a process of inferring events from network activity signatures, according to various embodiments.

FIG. 5 schematically illustrates a process 500 of inferring events from network activity signatures, according to various embodiments. Process 500 may be performed by server 200, for example.

Memory block 502 may be used to store a database of network activity signatures that have been generated from previous network transaction data for network transactions performed by one or more client devices. In some examples, such network transaction data may be data that is anonymized over a relatively large number of users and client devices. This data, for instance, may have been collected over a relatively long period of time (e.g., days, weeks, months, etc.) and may be updated periodically or from time to time. At block 504, an additional network activity signature for a particular application session may be generated and provided to compare block 506. In particular, server 200 may generate the additional network activity signature using additional network transaction data for network transactions associated with the particular application and performed by a particular client device. Compare block 506 may compare the additional network activity signature to each or any of the network activity signatures stored in the database of memory block 502.

In some embodiments, the additional network activity signature for the particular application session need not be generated, such as at block 504. Instead, the additional network transaction data for the network transactions may be provided from block 508 directly to compare block 506. In other words, server 200 need not generate an additional network activity signature from the additional transaction data and instead provide the additional transaction data directly to compare block 506. This approach is basically skipping a step that is generally performed by block 504. Subsequently, compare block 506 may compare the additional transaction data to each or any of the network activity signatures stored in the database of memory block 502.

Machine learning block 510 may be involved in the comparing processes of block 506. Machine learning block 510 may be the same as or similar to machine learning module 220 illustrated in FIG. 2. Machine learning block 510 may, for example, apply pattern recognition and/or machine learning processes to compare one or more network activity signatures of block 502 with the additional network activity signature of block 504 or the additional network transaction data of block 508. At block 512, such comparing may allow server 200, for example, to infer events associated with the additional network activity signature or the additional network transaction data. In some embodiments, network activity signatures in the database of memory block 502 may facilitate training for the machine learning of block 510.

Figure 6:
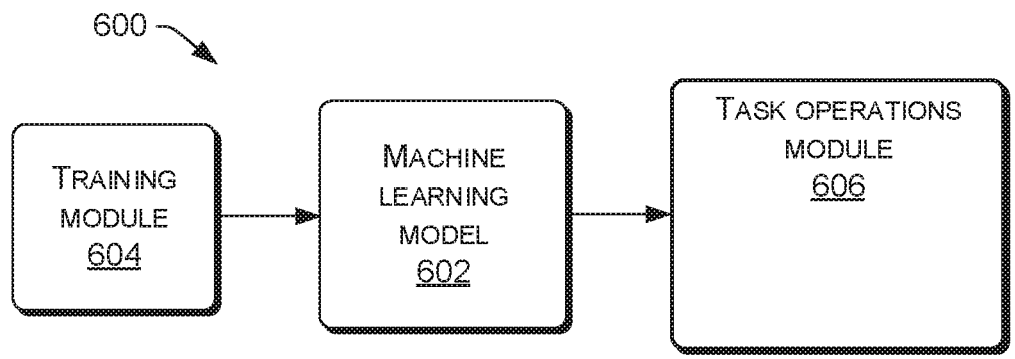
FIG. 6 is a block diagram of an example machine learning system.

FIG. 6 is a block diagram of a machine learning system 600, according to various examples. Machine learning system 600 includes a machine learning model 602 (which may be similar to or the same as machine learning module 220, illustrated in FIG. 2), a training module 604, and a compare module 606, which may operate the same as or similar to compare block 506, for example. Although illustrated as separate blocks, in some compare module 606 may include machine learning model 602. Machine learning model 602 may receive training data from training module 604. For example, training data may include a database of network activity signatures from memory block 502, illustrated in FIG. 5.

Figure 7:
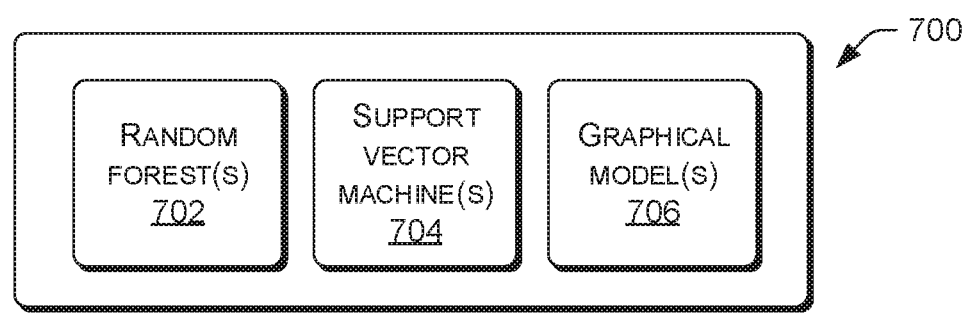
FIG. 7 is a block diagram of example machine learning models.

FIG. 7 is a block diagram of a machine learning model 700, according to various examples. Machine learning model 700 may be the same as or similar to machine learning model 602 shown in FIG. 6. Machine learning model 700 includes any of a number of functional blocks, such as random forest block 702, support vector machine block 704, and graphical model block 706. Random forest block 702 may include an ensemble learning method for classification that operates by constructing decision trees at training time. Random forest block 702 may output the class that is the mode of the classes output by individual trees, for example. Random forest block 702 may function as a framework including several interchangeable parts that can be mixed and matched to create a large number of particular models. Constructing a machine learning model in such a framework involves determining directions of decisions used in each node, determining types of predictors to use in each leaf, determining splitting objectives to optimize in each node, determining methods for injecting randomness into the trees, and so on.

Support vector machine block 704 classifies data for machine learning model 700. Support vector machine block 704 may function as a supervised learning model with associated learning algorithms that analyze data and recognize patterns, used for classification and regression analysis. For example, given a set of training data, each marked as belonging to one of two categories, a support vector machine training algorithm builds a machine learning model that assigns new training data into one category or the other.

Graphical models block 706 functions as a probabilistic model for which a graph denotes conditional dependence structures between random variables. Graphical models provide algorithms for discovering and analyzing structure in distributions and extract unstructured information. Applications of graphical models, which may be used to infer one or more events within an application session, may include information extraction, pattern recognition, data type recognition, and decoding of low-density parity-check codes, just to name a few examples.

Figure 8:
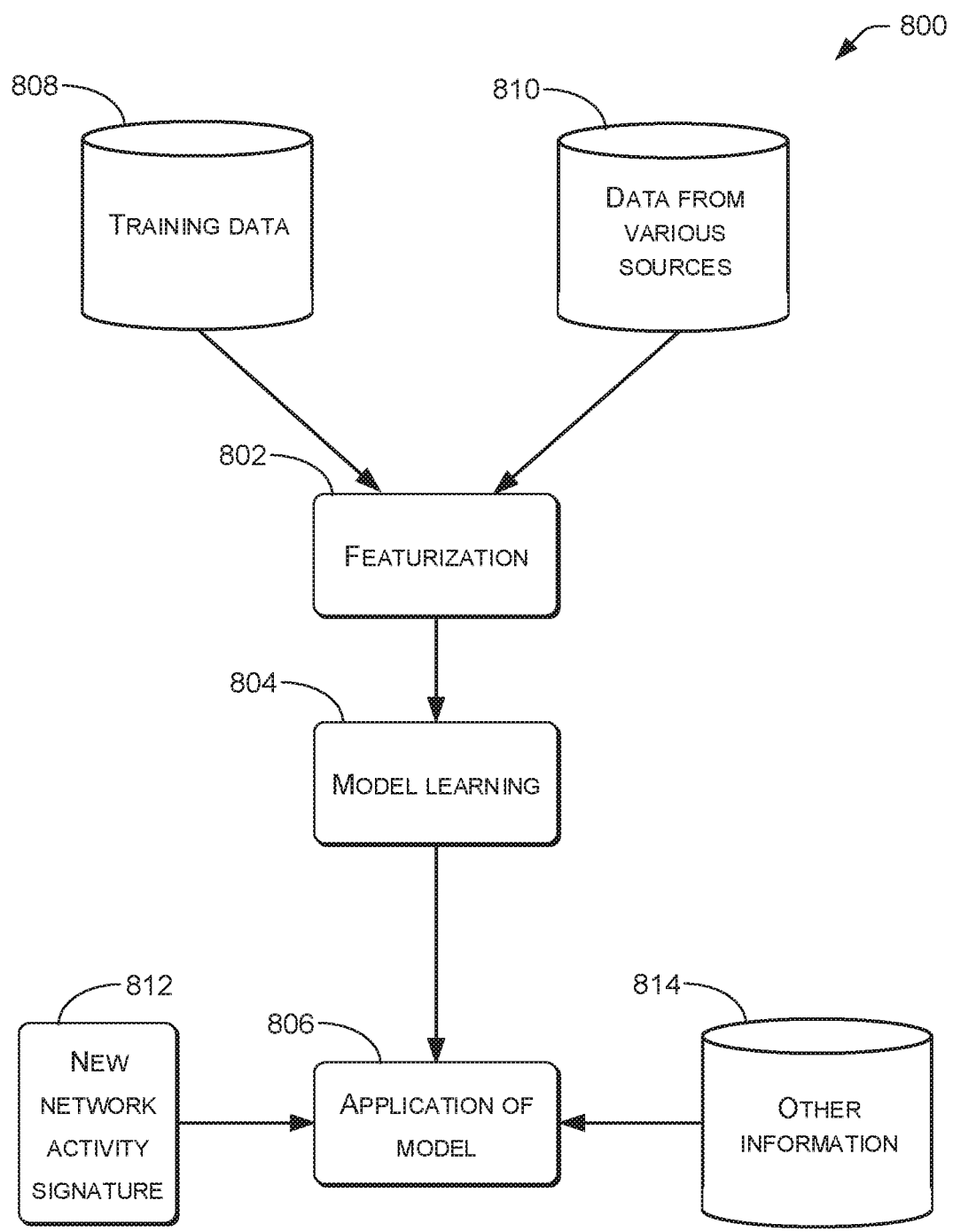
FIG. 8 schematically illustrates applying machine learning to infer events in a wireless communication network, according to various embodiments.

FIG. 8 is a block diagram illustrating processes 800 involved in inferring one or more events within an application session. Such processes may be performed by a processor (e.g., 204) executing applications or module(s) (e.g., 216, 218, and/or 220) or a computing device, such as server 200 described above. A featurization process 802 and a model learning process 804 may be performed by the computing device offline or online. In some examples, any or all of featurization process 802, model learning process 804, and a process 806 of applying the model may be performed by a machine learning module (e.g., machine learning module 220, illustrated in FIG. 2).

In some examples, featurization process 802 may receive training data 808 and data 810 from various sources, such as memory block 502 illustrated in FIG. 5. Featurization process 802 may generate feature sets of network activity signatures, or portions thereof, that are capable of classification. Such a classification, for example, may be used in model learning process 804. Individual network activity signatures may comprise portions of content of one or more transaction (e.g., generally a relatively large number of transactions of training data 808). Model learning process 804 is a machine learning process that generates and iteratively improves a model used in process 806 for inferring events of an application session. For example, the model may be applied to a newly generated network activity signature resulting from an application session. A computing device may perform model learning process 804 continuously, from time to time, or periodically, asynchronously from the process 806 of applying the model to new network activity signatures 812.

The process 806 of applying the model to new network activity signatures 812 may involve consideration of other information 814, such as a current state (e.g., traffic flow, operability, and so on) of a network, a current state of a particular website, and personal data (e.g., behaviors, geography, and so on) of one or more users.

Figure 9:
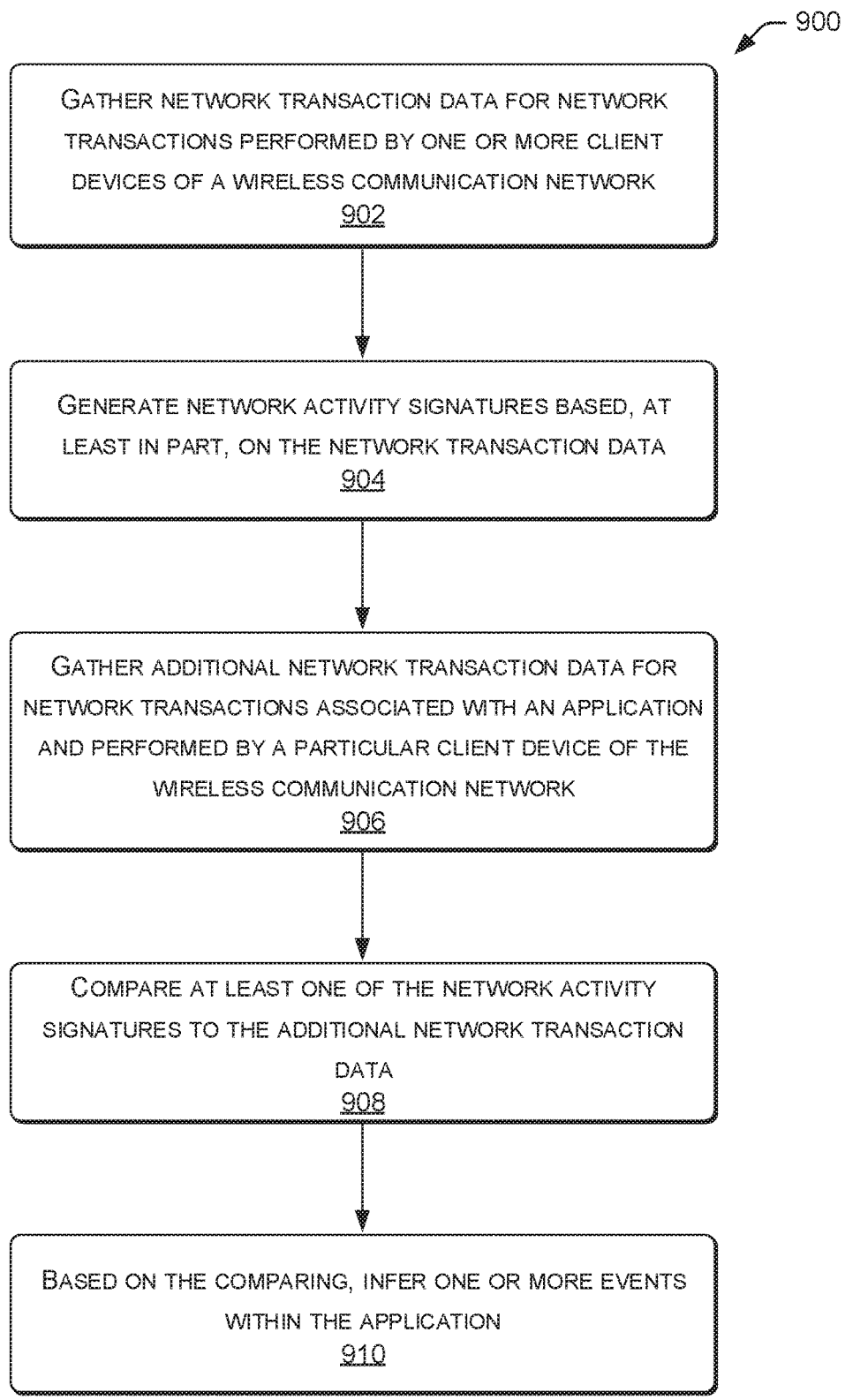
FIG. 9 is a flow diagram of process for inferring events in a wireless communication network, according to various embodiments.

FIG. 9 is a flow diagram of process 900 for inferring events in a wireless communication network, according to various embodiments. For example, process 900 may be performed by server 200, illustrated in FIG. 2, or more specifically, in other examples, may be performed by a combination of applications module 216, NAS generator module 218, and machine learning module 220, illustrated in FIG. 2.

At block 902, the server may gather network transaction data for network transactions performed by one or more client devices of a wireless communication network. In some examples, the network transaction data includes metrics associated with user behavior of the one or more client devices. For instance, such metrics may be reflective of the user's behavior as opposed to the behavior or operation of the client device (e.g., which is based on executed code). An example of a user's behavior may be the user's tendency to often listen to or purchase music, which may indicate a high likelihood that this user will engage in an application session with Pandora® or another music website.

At block 904, the server may generate network activity signatures based, at least in part, on the network transaction data. In some examples, generating the network activity signatures is further based, at least in part, on patterns and sequences of the network transaction data At block 906, the server may gather additional network transaction data for network transactions associated with a particular application and performed by a particular client device of the wireless communication network. At block 908, the server may compare at least one of the network activity signatures to the additional network transaction data. At block 910, the server may, based on the comparing, infer one or more events within the application. For example, an event may involve the user of the particular client device selecting an advertisement embedded in the application.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claims is:

1. A computer-implemented method comprising:
    gathering network transaction data for network transactions performed by a plurality of client devices of a wireless communication network from weblogs, each client device being associated with a weblog,
        wherein the network transaction data in at least two of the weblogs includes different types of network transaction data, and
        wherein the number of client devices exceeds a threshold for ensuring anonymity of client devices;
    generating network activity signatures based, at least in part, on the network transaction data including the different types of network transaction data and metrics of the network transaction data associated with the user behavior of the client devices;
    gathering additional network transaction data for network transactions associated with an application and performed by a particular client device of the wireless communication network;
    comparing at least one of the network activity signatures to the additional network transaction data; and
    based on the comparing, inferring one or more events within the application, the inferring of the one or more events being performed without using data related to or derived from direct detection or direct measurement of the one or more events.

2. The computer-implemented method of claim 1, wherein generating the network activity signatures is further based, at least in part, on patterns and sequences of the network transaction data.

3. The computer-implemented method of claim 1, wherein the network transaction data includes metrics associated with bulk data transfer to the client devices.

4. The computer-implemented method of claim 1, further comprising anonymizing the network transaction data prior to generating the network activity signatures.

5. The computer-implemented method of claim 1, further comprising:
    using the network activity signatures as training data;
    machine learning associations among the network activity signatures and the network transactions; and
    inferring the one or more events within the application based, at least in part, on the machine learning.

6. An apparatus comprising:
    a non-transitory storage medium; and
    instructions stored in the non-transitory storage medium, the instructions being executable by the apparatus to:
        gather network transaction data for network transactions performed by a plurality of client devices of a wireless communication network from weblogs, each client device being associated with a weblog,
            wherein the network transaction data in at least two of the weblogs includes different types of network transaction data, and wherein the number of client devices exceeds a threshold for ensuring anonymity of client devices;

generate network activity signatures based, at least in part, on the network transaction data including the different types of network transaction data and metrics of the network transaction data associated with the user behavior of the client devices;

gather additional network transaction data for network transactions associated with an application and performed by a particular client device of the wireless communication network;

compare at least one of the network activity signatures to the additional network transaction data; and based on the comparing, infer one or more events within the application, the inferring of the one or more events being performed without using data related to or derived from direct detection or direct measurement of the one or more events.

7. The apparatus of claim 6, wherein generating the network activity signatures is further based, at least in part, on patterns and sequences of the network transaction data.

8. The apparatus of claim 6, wherein the network transaction data includes metrics associated with bulk data transfer to the client devices.

9. The apparatus of claim 6, wherein the instructions are further executable by the apparatus to:

use the network activity signatures as training data;

machine learn associations among the network activity signatures and the network transactions; and infer the one or more events within the application based, at least in part, on the machine learning.

10. The apparatus of claim 6, wherein the instructions are further executable by the apparatus to:

generate an additional network activity signature based, at least in part, on the additional network transaction data, wherein the comparing the at least one of the network activity signatures to the additional network transaction data further comprises comparing the at least one of the network activity signatures to the additional network activity signature.

11. A wireless communication network comprising:
one or more processors;
a non-transitory storage medium; and
instructions stored in the non-transitory storage medium, the instructions being executable by the one or more processors to:

gather network transaction data for network transactions performed by a plurality of client devices of a wireless communication network from weblogs, each client device being associated with a weblog, wherein the network transaction data in at least two of the weblogs includes different types of network transaction data, and wherein the number of client devices exceeds a threshold for ensuring anonymity of client devices;

generate network activity signatures based, at least in part, on the network transaction data including the different types of network transaction data and metrics of the network transaction data associated with the user behavior of the client devices;

gather additional network transaction data for network transactions associated with an application and performed by a particular client device of the wireless communication network;

compare at least one of the network activity signatures to the additional network transaction data; and based on the comparing, infer one or more events within the application, the inferring of the one or more events being performed without using data related to or derived from direct detection or direct measurement of the one or more events.

12. The wireless communication network of claim 11, wherein the instructions are further executable by the one or more processors to anonymize the network transaction data prior to generating the network activity signatures.

13. The wireless communication network of claim 11, wherein the instructions are further executable by the one or more processors to:

use the network activity signatures as training data;

machine learn associations among the network activity signatures and the network transactions; and infer the one or more events within the application based, at least in part, on the machine learning.

14. The wireless communication network of claim 11, wherein the network transaction data includes metrics associated with bulk data transfer to the client devices.

* * * * *